United States Patent [19]

Seki et al.

[11] Patent Number: 5,043,865
[45] Date of Patent: Aug. 27, 1991

[54] PROFILE REVISING METHOD

[75] Inventors: Masaki Seki; Takashi Takegahara, both of Tokyo; Takeshi Arakaki, Yamanashi, all of Japan

[73] Assignee: Fanuc Ltd, Minamitsuru, Japan

[21] Appl. No.: 342,532

[22] PCT Filed: Aug. 31, 1988

[86] PCT No.: PCT/JP88/00864
§ 371 Date: Apr. 17, 1989
§ 102(e) Date: Apr. 17, 1989

[87] PCT Pub. No.: WO89/02107
PCT Pub. Date: Mar. 9, 1989

[30] Foreign Application Priority Data

Sep. 2, 1987 [JP] Japan .................. 62-219747

[51] Int. Cl.$^5$ .................. G05B 19/403; G06F 3/04
[52] U.S. Cl. .................. 364/192; 364/188; 364/474.22
[58] Field of Search .................. 364/191, 192, 474.22, 364/474.23, 474.24, 474.29, 518, 521, 522, 188, 189

[56] References Cited

U.S. PATENT DOCUMENTS 4,802,038  1/1989  Isobe et al. .................. 364/191
4,939,635  7/1990  Seki et al. .................. 364/191

Primary Examiner—Jerry Smith
Assistant Examiner—Paul Gordon
Attorney, Agent, or Firm—Staas & Halsey

[57] ABSTRACT

When a profile (A) has been defined, a part program in accordance with the definition is stored in advance. When a figure element ($C_1$) constituting the profile has been revised to be another figure element ($C_1'$) figure elements (straight lines $S_1$ and $S_2$) defined utilizing the figure element (circular arc $C_1$) are also changed to reflect the results of the revision in order to be converted into other figure elements (straight lines $S_1'$ and $S_2'$), thereby revising the profile to a profile (B).

3 Claims, 6 Drawing Sheets

FIG. 2

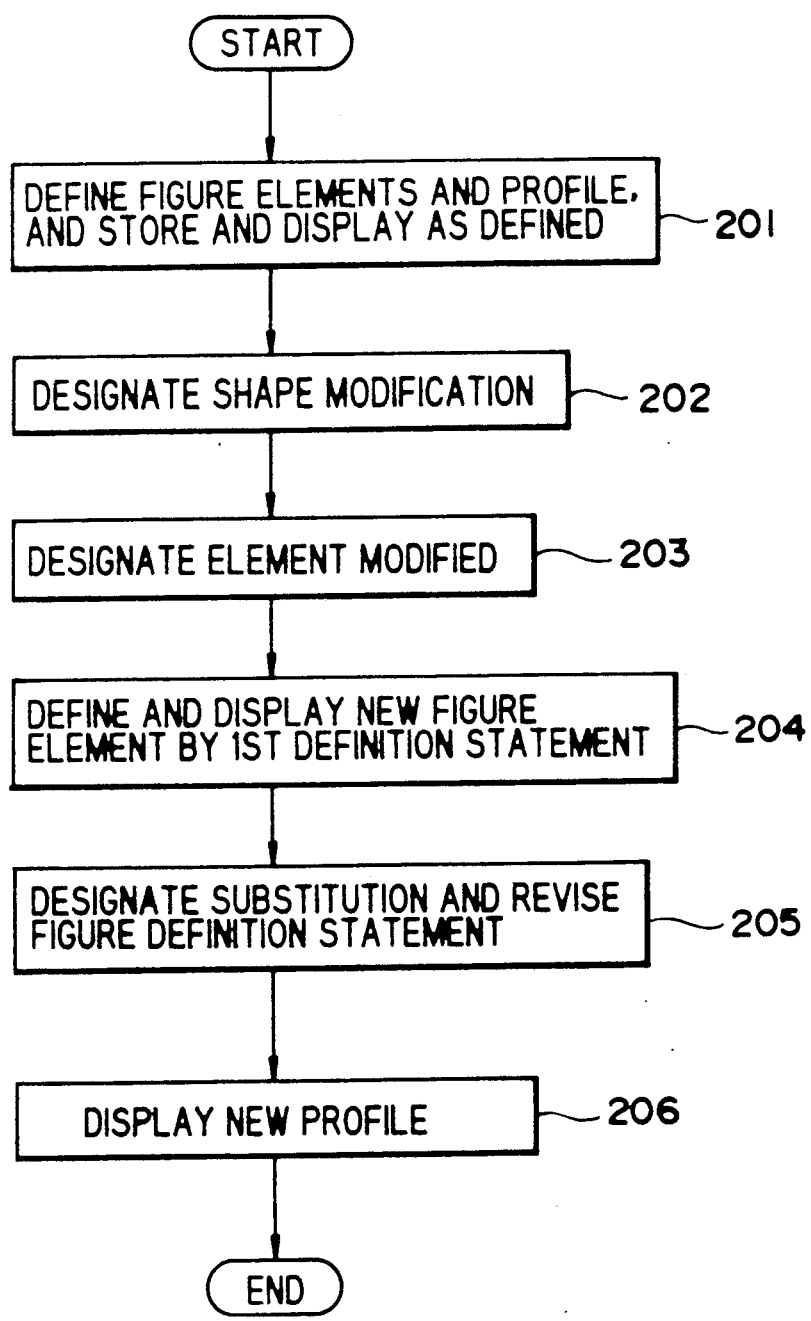

1

PROFILE REVISING METHOD

BACKGROUND OF THE INVENTION

This invention relates to a method of revising a profile, and more particularly, to a profile revising method for revising a profile generated by joining, in order, figure elements specified by figure definition statements in an automatic programming language.

In an automatic programming system for creating numerical control (NC) data using an automatic programming language such as APT (automatic programming tools) or FAPT.

A part program based on the automatic programming language is created by defining points, straight lines and circular arcs using simple symbols (this is referred to as "figure definition"), and then defining a tool path using the defined points, straight lines and circular arcs (referred to as "motion statement definition"). The part program based on the automatic programming language is subsequently converted into NC data comprising NC data (EIA codes or ISO codes) in a format capable of being executed by an NC unit.

For example, in the creation of a part program for moving a tool along a part profile A comprising straight lines and a circular arcs shown in FIG. 6(a), figure definition is performed by defining a point $P_1$, straight lines $S_1$, $S_2$ and $S_3$ and a circle Cl (see FIG. 6(b)), which are necessary for defining a part profile, as follows using a keyboard or tablet:

$$C_1 = x_3, y_3, r_1 \quad (1)$$

$$P_1 = x_1, y_1 \quad (2)$$

$$P_2 = x_2, y_2 \quad (3)$$

$$S_1 = P_1, C_1, L \quad (4)$$

$$S_2 = P_2, C_1, R \quad (5)$$

$$S_3 = P_1, P_2 \quad (6)$$

Thereafter, the figure elements (which are displayed on a CRT screen) are picked in order, e.g., $$S_1 \rightarrow C_1 \rightarrow S_2 \rightarrow S_3$$

to define the profile A, (FIG. 6(a)), after which machining starting and end points, etc., of the part profile A are designated by a motion statement definition to define a tool path along which a tool is moved.

In the foregoing, (1) signifies a circle of center $(x_3, y_3)$ and radius $r_1$;

(6) signifies a straight line passing through points $P_1$, $P_2$;

(4) signifies a left-side tangent line (straight line) of two tangent lines passing through point $P_1$ and contacting the circle $C_1$; and (5) signifies a right-side tangent line (straight line) of two tangent lines passing through point $P_2$ and contacting the circle $C_1$. The character L is a qualifier meaning "left", and the character R is a qualifier meaning "right". There are two methods of figure definition. A first method entails defining points, straight lines and circles using absolute numeric data. A point is defined as $$P = x, y$$

2 using the coordinates (x,y) of the point (see FIG. 7(a), a straight line is defined as $S = P_1, P_2$ or $S = x_1, y_1, x_2, y_2$ using two points $(x_1,y_1)$, $(x_2,y_2)$ through which the straight line passes (see FIG. 7(b)), and a circle is defined as $$C = x, y, r$$

using the coordinates (x,y) of the center of the circle and the radius r of the circle (see FIG. 7(c)).

The second method entails defining points, straight lines and circles using other elements (points, straight lines and circles) that have already been defined. For example, point $P_1$ is defined as follows with reference to FIG. 7(d):

$$P_1 = S, C, L$$

straight line $S_1$ is defined as follows with reference to FIG. 7(e):

$$S_1 = C_1, C_2, A$$

(the upper straight line tangent to two circles $C_1$ and $C_2$, where A is the qualifier meaning "upper"), and circle C is defined as follows with reference to FIG. 7(f):

$$C = S_1, S_2, S_3$$

(a circle tangent to three straight lines). The foregoing method in which elements already defined are used to define other elements is only one example, there being many other methods of definition available.

When figure definition is performed in the prior art, the arrangement is such that a figure is defined by a first definition statement or, alternatively, an already defined figure is used to define another figure by a second definition statement. A figure defined by a second definition statement is re-expressed internally by the first definition statement, which uses coordinate data. Therefore, the second definition statement is erased. Consequently, in a case where it is desired to modify the part profile, as shown in FIG. 8, by changing the radius of the circular arc $C_1$ of the profile A (see FIG. 6(a)), the figure is defined by the following part program:

$$C_1 = x_3, y_3, r_1$$

$$P_1 = x_1, y_1$$

$$P_2 = x_2, y_2$$

$$S_1 = P_1, C_1, L$$

$$S_2 = P_2, C_1, R$$

$$S_3 = P_1, P_2$$

$$S_1$$

$$C_1$$

$$S_2$$

$$S_3$$

PEND

The prior art is such that the profile must be specified by redefining each figure element from the beginning and picking the figure elements in order along the profile. As a result, revising the already defined profile is a troublesome task.

Accordingly, an object of the present invention is to provide a profile revising method through which a profile can be revised merely by solely modifying the figure definition statement of a figure element relating to a modification.

SUMMARY OF THE INVENTION

When a profile has been defined, a figure definition statement (part program) in accordance with the definition is stored in advance. When a predetermined figure element constituting the profile has been revised, the figure definition statement of the revised figure element in the part program is revised. A new profile is generated based on the new part program resulting from the revision. In this way another figure element defined by utilizing the revised figure element is made to reflect the revised result to revise the profile into another profile.

BRIEF DESCRIPTION OF THE DRAWINGS

FIG. 2 is a portion describing the menu chart;

FIG. 3 is a flowchart of processing according to the present invention;

DESCRIPTION OF THE PREFERRED EMBODIMENT

Figure 1:
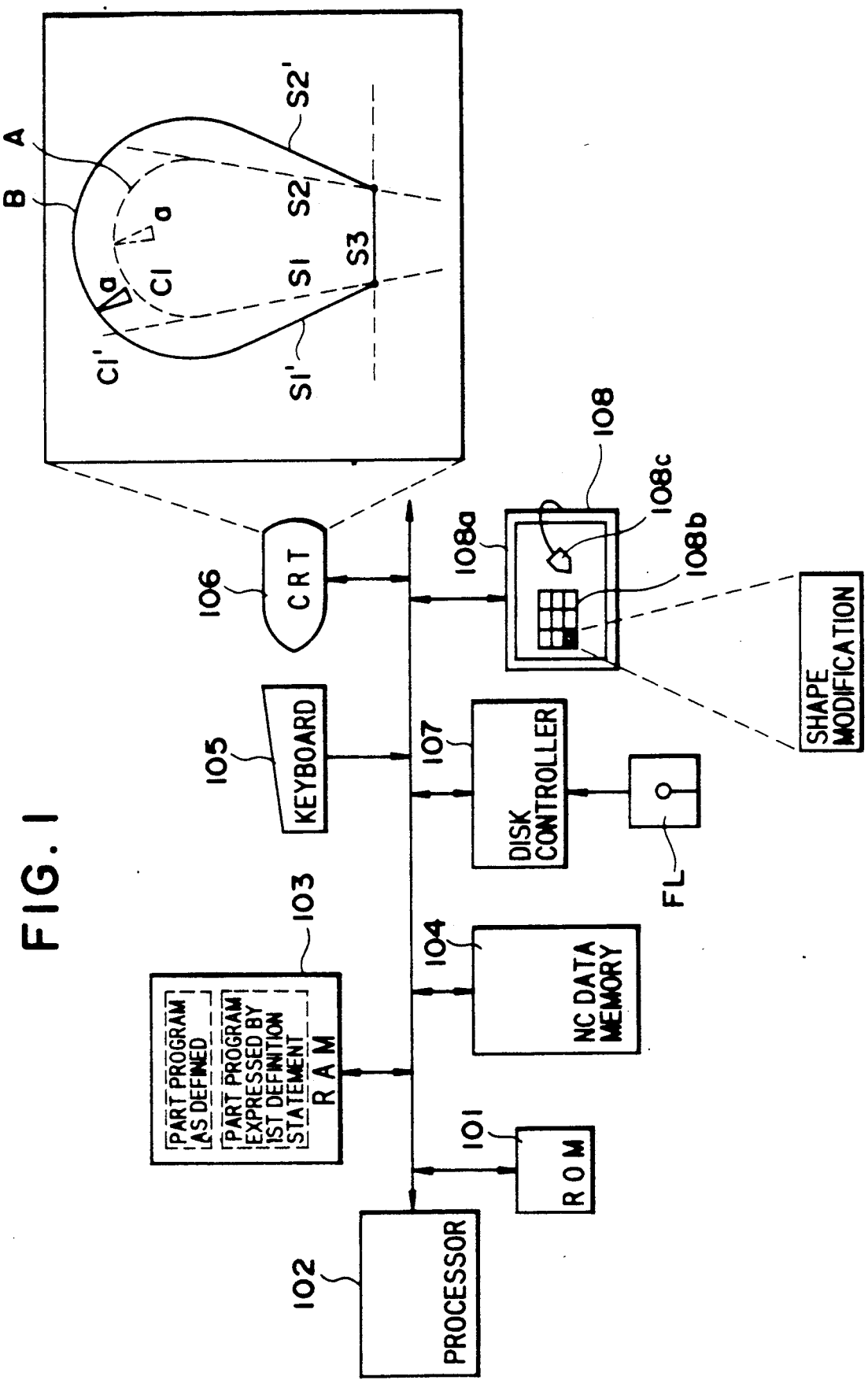
FIG. 1 is a block diagram of an apparatus which can employ the present invention.

FIG. 1 is a block diagram of an apparatus for practicing the method of the present invention.

Numeral 101 denotes a ROM for storing a loading program and the like. Numeral 102 is a processor for executing automatic programming processing, and 103 is a RAM for storing a system program read in from a floppy FL, as well as for storing various parameters and processing results. Numeral 104 denotes an NC data memory for storing the finally created NC data having an executable format, 105 is a keyboard, 106 is a display unit (CRT), 107 is a disc controller, and 108 is a tablet device having a tablet surface 108a to which a menu chart 108b having menu items is affixed. Prescribed menu items are picked by a tablet cursor 108c. A graphic cursor GCS on a display screen is moved by moving the cursor 108a on the tablet surface. FL represents a floppy disc.

The CRT 106 displays a profile A (the dashed line) which prevails prior to a revision, the profile being composed of straight lines $S_1$, $S_2$ and $S_3$ and a circular arc $C_1$. The CRT 106 also displays a profile B which prevails after a revision, this profile being composed of straight lies $S_1'$, $S_2'$, and $S_3$ and a circular arc $C_1'$.

Figure 2:
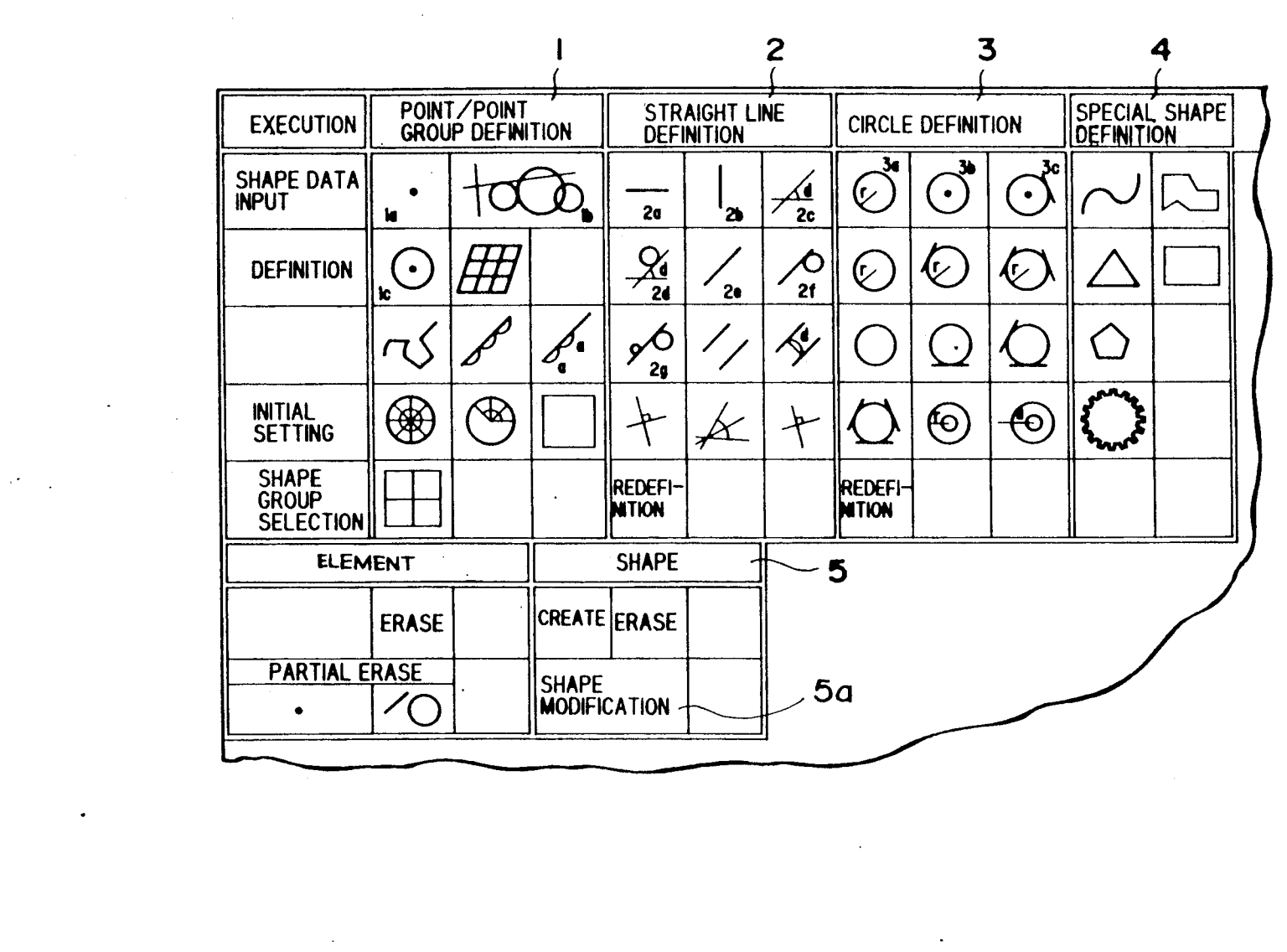

FIG. 2 is a diagram for describing the principal parts of the menu chart 108b. Numeral 1 is a "POINT-/POINT GROUP DEFINITION" section, 2 is a "STRAIGHT LINE DEFINITION" section, 3 is a "CIRCLE DEFINITION" section, 4 is a "SPECIAL SHAPE DEFINITION" section and 5 is a "SHAPE DEFINITION" section. The "SHAPE DEFINITION" section 5 includes a "SHAPE MODIFICATION" item 5a.

The profile revising method of the present invention will now be described in accordance with the flowchart of FIG. 3 and the diagrams of FIGS. 4 and 5 for describing the processing. It should be noted that the system program for creating the NC part program, parameters and the like have already been stored in the RAM 103 from the floppy disc FL.

Figure 4A:
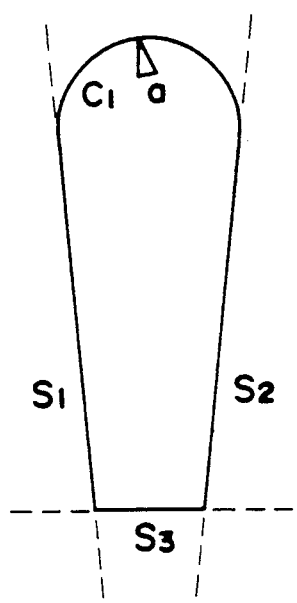
FIGS. 4(a) through 5 are diagrams describing an embodiment of the present invention.
Figure 5:
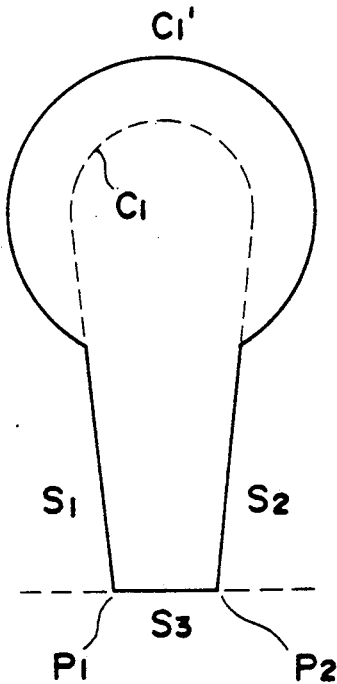
Figure 6A:
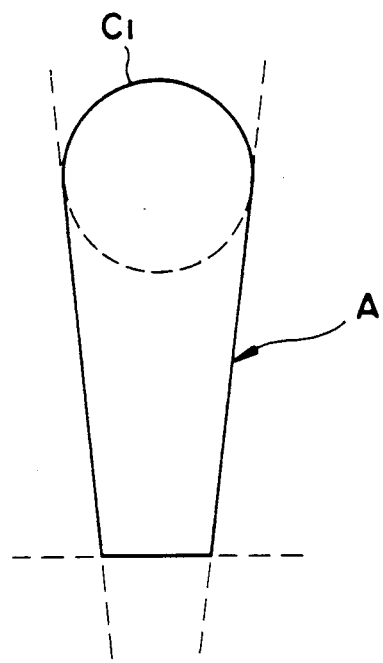
FIG. 6(a) through 8 are diagrams describing an example of the prior art.
Figure 6B:
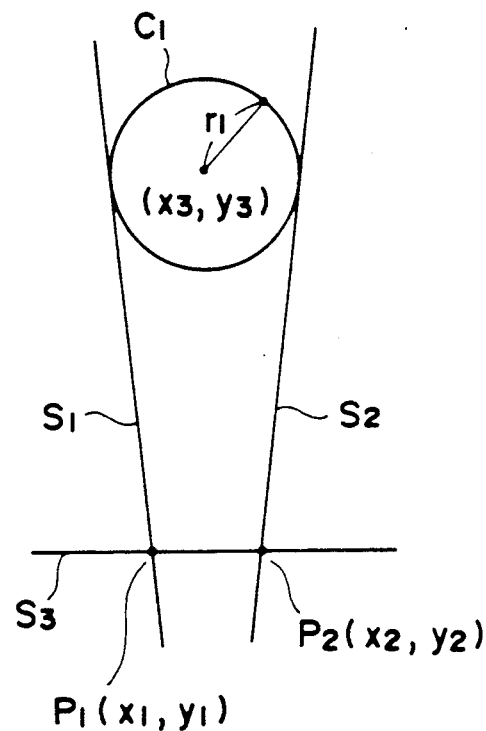
Figure 8:
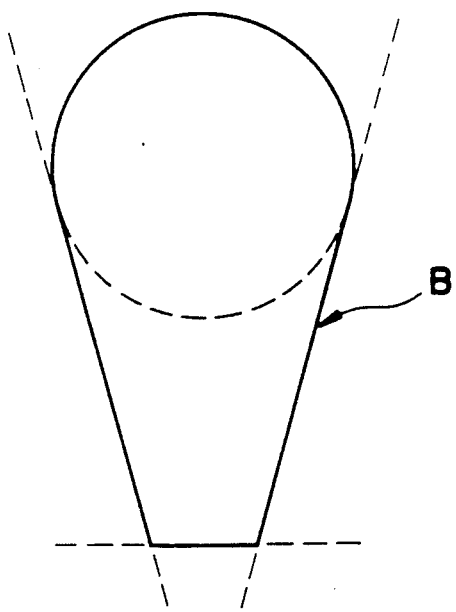
Figure 7A:
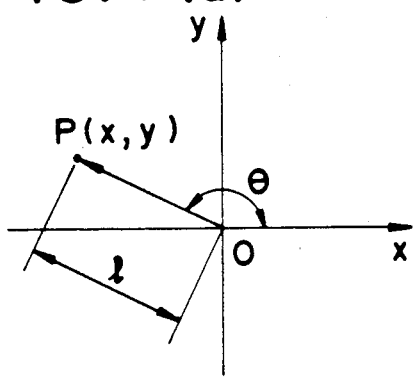
Figure 7B:
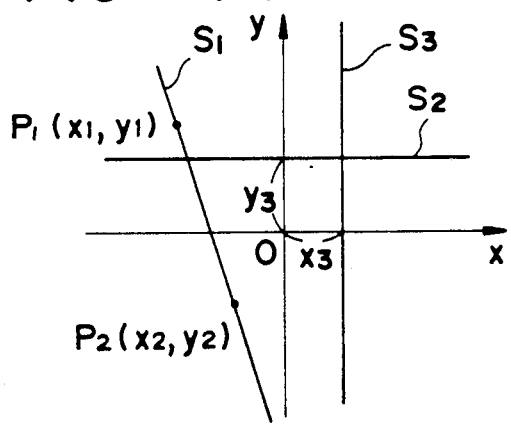
Figure 7C:
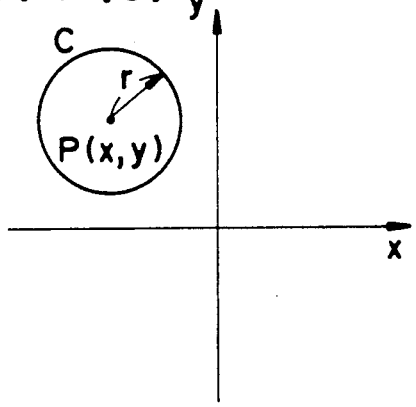
Figure 7D:
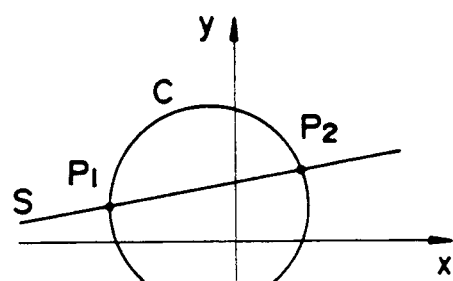
Figure 7E:
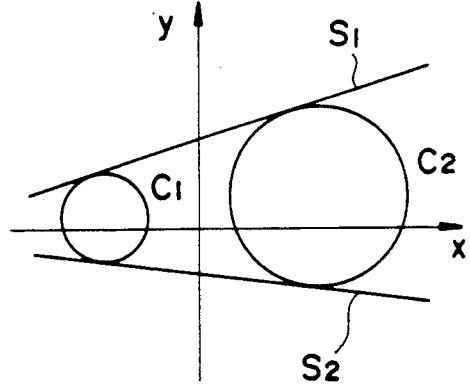
Figure 7F:
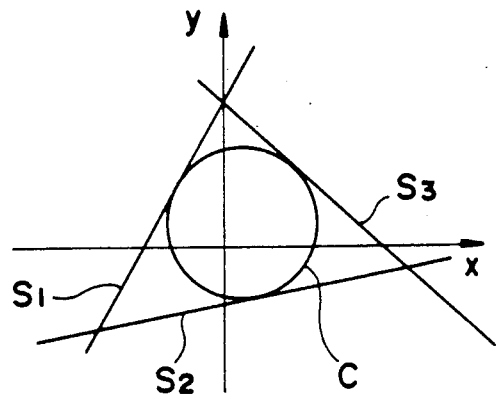

The figure elements which are the straight lines $S_1$, $S_2$, $S_3$ and the circular arc $C_1$ shown in FIG. 4(a) are defined by directly entering coordinates using the tablet 108 and keyboard 105 (figure definition by the first definition statement) or by citing already defined figure elements displayed on the CRT 106 (figure definition by the second definition statement). As described above with regard to the prior art in relation to FIG. 6, a part program is created by figure definition and profile definition in the following manner:

$C_1 = x_3, y_3, r_1$
$P_1 = x_1, y_1$
$P_2 = x_2, y_2$
$S_1 = P_1, C_1, L$
$S_2 = P_2, C_1, R$
$S_3 = P_1, P_2$
  ... (The above is the figure definition portion.)
$S_1$
$C_1$
$S_2$
$S_3$
  ... (The above is the profile definition portion.)
PEND ... (This represents program end.)

In accordance with the present invention, the part program defined above is stored in the RAM 103 without being erased. The entirety of the second definition statement of the part program is re-expressed by the first definition statement and is similarly stored in the RAM 103. A profile is generated based on the part program of the first definition statement, and the profile is displayed on the CRT (step 201).

If the "SHAPE MODIFICATION" item 5a is picked from the tablet menu 108b under these conditions, the processor 102 causes the CRT 106 to display the prompt "SELECT ELEMENT TO BE MODIFIED" (step 202).

If the graphic cursor a is positioned on the circular arc $C_1$, which is the element to be modified, and this element is picked, the processor 102 causes the color of circular arc Cl to change to another color and causes the CRT 106 to display the prompt "DESIGNATE ELEMENT TO BE SUBSTITUTED".

Figure 4B:
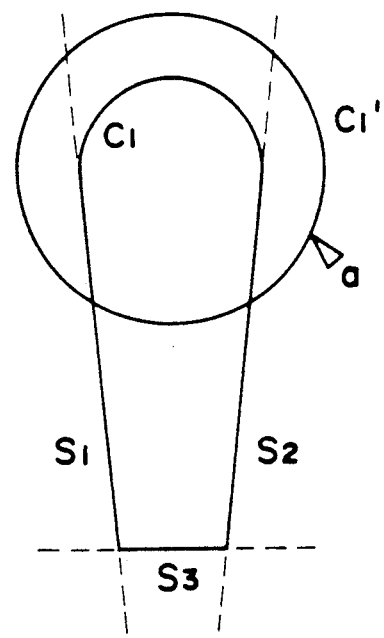
Figure 4C:
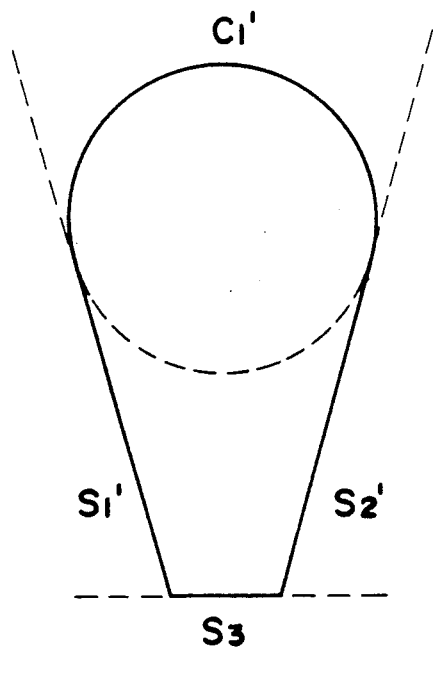

In order to define the "element to be substituted", the operator picks the "CIRCLE DEFINITION" item 3a from the tablet menu 108b and then inputs the coordinates ($x_3'$, $y_3'$) of the center of the circle as well as the radius $r_3'$ of the circle, whereupon the processor 102 causes the CRT 106 to display a circle $C_1'$ specified by the input data (step 204; see FIG. 4(b)).

Thereafter, the "element to be substituted" is designated by picking the circle $C_1'$ using the graphic cursor a, whereupon the processor 102 converts the circle definition statement $C_1 = x_3, y_3, r_3$ in the abovementioned part program into the following definition statement (step 205):

$C_1 = x_3', y_3', r_3'$

Next, the processor 102 generates the profile, following its modification, by the new part program and displays it on the CRT 106 (see step 4(c); step 206). In this case, the straight lines $S_1$, and $S_2$, defined as being tangent to the circle $C_1$ before its modification, are modified into straight lines S, and $S_2'$ tangent to the circle $C_1'$ after its modification. In a case where the definition is to the effect that the straight lines $S_1$, and $S_2$ are "tangent to circle $C_1$" has not been made, that is, a case where the figure definition statement is not one in which the straight lines $S_1$, and $S_2$ utilize the circle $C_1$, the straight lines $S_1$, and $S_2$ do not change even if circle $C_1$ is modified, as shown in FIG. 5.

In accordance with the present invention, the arrangement is such that when a figure element defined by a first figure definition statement is modified, a figure element of a second definition statement utilizing the above mentioned figure element also is revised, and the new profile is generated. Accordingly, a profile can be revised in a simple manner merely by solely modifying the first figure definition statement, without requiring that the profile be defined anew from the beginning.

We claim:

1. A method of revising a profile generated by joining, in a designated order, figure elements specified by a first figure definition statement which defines a point by coordinates of the point, a straight line specified by coordinates of two points, and a circle specified by coordinates of a center of the circle and the radius thereof, and a second definition statement which defines a point, a straight line and a circular arc by using figure elements already defined, said method comprising the steps of:

a) storing, as defined, a part program which includes the first and second figure definition statements for defining each figure element in the designated order;

b) revising a predetermined figure element forming a profile defined by one of the first and second figure definition statements;

c) revising a figure element defined by the other one of the first and second figure definition statements utilizing the revised figure element in the part program; and d) generating a new profile based on the new part program after the revision.

2. A method of revising a profile according to claim 1, further comprising the steps of:

e) displaying a profile on a display screen prior to the revision; and f) displaying a specified figure element to be revised in a manner distinguishable from other figure elements.

3. A method of revising a profile according to claim 1, further comprising the steps of:

e) displaying a new figure element on a display screen when anew figure element to be substituted for a figure element to be revised is defined by a first definition statement; and f) substituting a definition statement of the revised figure element in the part program by a definition statement of the new figure element in response to a substitution instruction.

* * * * *